United States Patent
Kobayashi et al.

(10) Patent No.: US 11,854,320 B2
(45) Date of Patent: Dec. 26, 2023

(54) INFORMATION COLLECTION DEVICE

(71) Applicant: Mitsubishi Electric Corporation, Tokyo (JP)

(72) Inventors: Hiroaki Kobayashi, Tokyo (JP); Nobutoshi Todoroki, Tokyo (JP); Kengo Akaho, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 770 days.

(21) Appl. No.: 16/981,707

(22) PCT Filed: May 18, 2018

(86) PCT No.: PCT/JP2018/019326
§ 371 (c)(1),
(2) Date: Sep. 17, 2020

(87) PCT Pub. No.: WO2019/220630
PCT Pub. Date: Nov. 21, 2019

(65) Prior Publication Data
US 2020/0409560 A1    Dec. 31, 2020

(51) Int. Cl.
*G07C 5/08* (2006.01)
*G06F 3/06* (2006.01)
(Continued)

(52) U.S. Cl.
CPC .......... *G07C 5/0866* (2013.01); *G06F 3/067* (2013.01); *G06F 3/0608* (2013.01);
(Continued)

(58) Field of Classification Search
None
See application file for complete search history.

(56) References Cited

U.S. PATENT DOCUMENTS 6,032,157 A * 2/2000 Tamano ............... G06F 16/22
2016/0180467 A1 * 6/2016 Griffin ............ G06F 16/7837
705/4

FOREIGN PATENT DOCUMENTS

JP   2008-141424 A   6/2008
JP   2010-158038 A   7/2010
(Continued)

OTHER PUBLICATIONS

Siegel, Josh, Dylan Erb, and Sanjay Sarma. "Algorithms and architectures: A case study in when, where and how to connect vehicles." IEEE Intelligent Transportation Systems Magazine 10.1 (2018): 74-87. (Year: 2018).*
(Continued)

*Primary Examiner* — Uyen T Le
(74) *Attorney, Agent, or Firm* — XSENSUS LLP

(57) ABSTRACT

An object is to provide a technique capable of appropriately storing data. An information collection device includes a similarity degree determination unit configured to obtain a degree of similarity between acquired-data and saved-data and generate a link that associates the acquired-data and the saved-data based on the degree of similarity, a request estimation unit configured to generate a link that associates the saved-data when the saved-data is read, and estimate a future request for the saved-data, and a data life determination unit configured to determine a storage time limit of the saved-data on a link-by-link basis.

7 Claims, 19 Drawing Sheets

(51) Int. Cl.
*G07C 5/00* (2006.01)
*G06V 20/56* (2022.01)
*G06V 20/59* (2022.01)
*G06V 10/75* (2022.01)

(52) U.S. Cl.
CPC .......... *G06F 3/0641* (2013.01); *G06F 3/0649* (2013.01); *G06V 10/75* (2022.01); *G06V 20/56* (2022.01); *G06V 20/59* (2022.01); *G07C 5/008* (2013.01)

(56) References Cited

FOREIGN PATENT DOCUMENTS

| JP | 2011-139468 A | 7/2011 |
| JP | 2013-156784 A | 8/2013 |

OTHER PUBLICATIONS

Lee, Uichin, et al. "Efficient data harvesting in mobile sensor platforms." Fourth Annual IEEE International Conference on Pervasive Computing and Communications Workshops (PERCOMW'06). IEEE, 2006. (Year: 2006).*

International Search Report and Written Opinion dated Aug. 21, 2018 for PCT/JP2018/019326 filed on May 18, 2018, 6 pages including English Translation of the International Search Report.

* cited by examiner

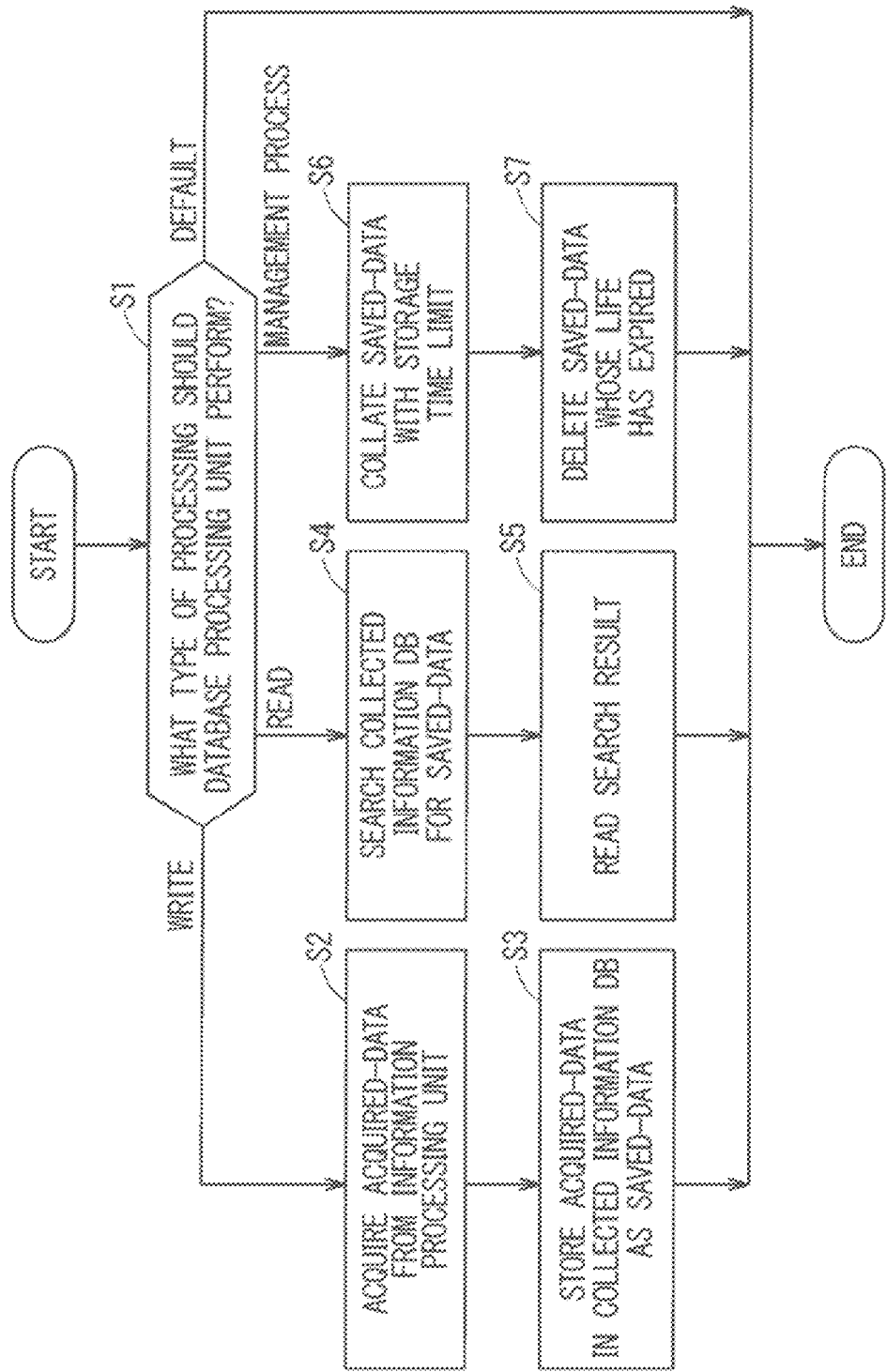
F I G. 2

FIG. 3

| IMAGE ID | IMAGE FILE NAME | PHOTOGRAPHER ID | DESTINATION |
|---|---|---|---|
| 00000001 | 00000001.mp4 | A1234 | ○○ CASTLE |
| 00000002 | 00000002.mp4 | A1234 | ○○ CASTLE |
| ⋮ | ⋮ | ⋮ | ⋮ |

F I G. 4

| IMAGE ID | TIME | LATITUDE | LONGITUDE | SPEED | ENGINE SPEED | ALTITUDE | CONGESTION |
|---|---|---|---|---|---|---|---|
| 00000001 | Dec. 14, 2017 13:26:27 | 34.758069 | 135.4205543 | 50km/h | 2500rpm | 5.0m | NO CONGESTION |
| 00000001 | Dec. 14, 2017 13:26:28 | 34.757616 | 135.4206020 | 49km/h | 2450rpm | 5.0m | NO CONGESTION |
| ... | ... | ... | ... | ... | ... | ... | ... |

FIG. 10

| LINK ID | LIFE |
|---|---|
| AAAAA | Jan 14, 2019 13:26:27 |
| AAAAB | Jan 15, 2019 14:13:19 |
| AAAAC | Jan 15, 2022 14:13:19 |
| ⋮ | ⋮ |

FIG. 11

| LINK ID | IMAGE ID |
|---|---|
| AAAAA | 00000001 |
| AAAAA | 00000002 |
| AAAAA | 00000004 |
| AAAAB | 00000100 |
| ⋮ | ⋮ |

INFORMATION COLLECTION DEVICE

CROSS-REFERENCE TO RELATED APPLICATION

The present application is based on PCT filing PCT/JP2018/019326, filed May 18, 2018, the entire contents of which are incorporated herein by reference.

TECHNICAL FIELD

The present invention relates to an information collection device that collects an image of at least one of inside and outside of a vehicle.

BACKGROUND ART

Vehicles having image capturing means for capturing images of the inside and outside of a vehicle have been widespread. The captured images are used for the safe driving of the vehicle that performs the image capturing in many cases. However, if the vehicle has a storage device or is connected to a network, the above image can be used for various purposes by using the vehicle per se as information collection means. On the other hand, image information is large in data size, and the prevention of tightening capacity of the storage area is required. Therefore, Patent Documents 1 and 2 propose techniques of setting a storage time limit for data such as an image based on some standard and erasing the data based on the storage time limit.

PRIOR ART DOCUMENTS

Patent Documents

[Patent Document 1] Japanese Patent Application Laid-Open No. 2011-139468
[Patent Document 2] Japanese Patent Application Laid-Open No. 2013-156784

SUMMARY

Problem to be Solved by the Invention

In the techniques of Patent Document 1 and Patent Document 2, the storage time limit is uniformly determined based on information such as position information, time, and free space of the storage device. For this reason, there has been a problem that images that are not at all necessary for a user may occupy the storage area, and as a result, the tightening of capacity of the storage area cannot be avoided.

The present invention has been made in view of the above problem, and has an object to provide a technique capable of appropriately storing data.

Means to Solve the Problem

According to the present invention, an information collection device includes an acquisition unit configured to acquire data including an image of at least one of inside and outside of a vehicle as acquired-data, a database configured to store the acquired-data acquired by the acquisition unit as saved-data, a similarity degree determination unit configured to obtain a degree of similarity between the acquired-data and the saved-data based on characteristics of the acquired-data and characteristics of the saved-data and generate a link that associates the acquired-data and the saved-data based on the similarity degree, a request estimation unit configured to generate a link that associates the saved-data when the saved-data is read, and estimate a future request for the saved-data, a time limit determination unit configured to determine a storage time limit of the saved-data in the database on a link-by link basis based on a generation result in the similarity degree determination unit and an estimation result in the request estimation unit, and a database processing unit configured to manage the saved-data in the database based on the storage time limit determined by the time limit determination unit.

Effects of the Invention

According to the present invention, the configuration includes the similarity degree determination unit configured to obtain a degree of similarity between the acquired-data and the saved-data based on the characteristics of the acquired-data and the saved-data and generate a link that associates the acquired-data and the saved-data based on the similarity degree, a request estimation unit configured to generate a link that associates the saved-data when the saved-data is read, and estimate a future request for the saved-data, the time limit determination unit configured to determine a storage time limit of the saved-data on a link-by link basis based on a generation result in the similarity degree determination unit and an estimation result in the request estimation unit, and the data base processing unit configured to manage the saved-data based on the storage time limit. According to such a configuration, data in the database can be appropriately stored.

The explicit purpose, feature, phase, and advantage of the present invention will be described in detail hereunder with attached drawings.

BRIEF DESCRIPTION OF DRAWINGS

FIG. 2 A flowchart illustrating the operation of a database processing unit according to Embodiment 1.
FIG. 3 A table illustrating an example of contents stored in a collected information DB according to Embodiment 1.
FIG. 4 A table illustrating an example of contents stored in a collected information DB according to Embodiment 1.
FIG. 10 A table illustrating an example of contents stored in a data life table according to Embodiment 1.
FIG. 11 A table illustrating an example of contents stored in the data life table according to Embodiment 1.

DESCRIPTION OF EMBODIMENTS

Embodiment 1

Figure 1:
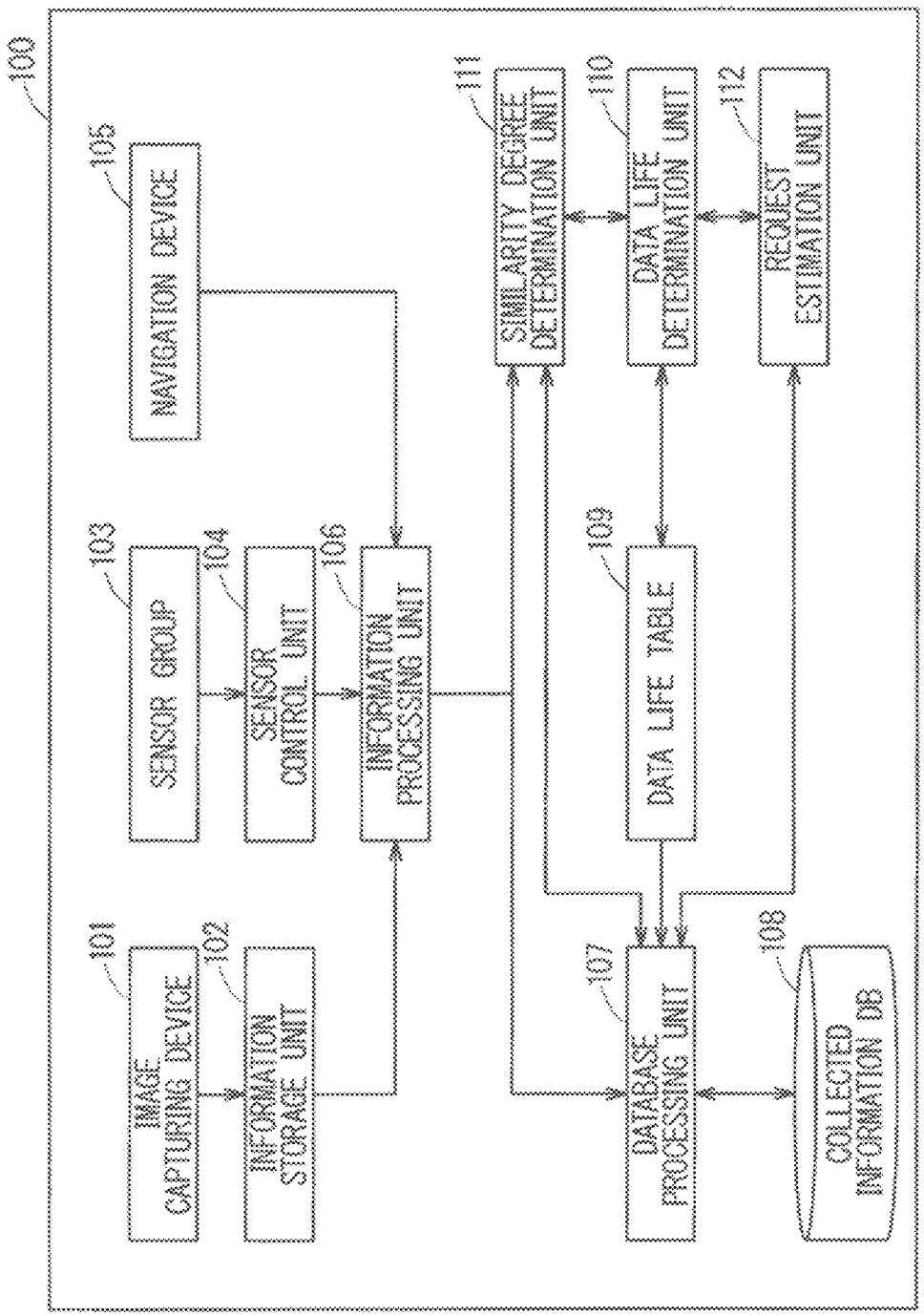
FIG. 1 A block diagram illustrating a configuration of an information collection device according to Embodiment 1.

FIG. 1 is a block diagram illustrating a configuration of an information collection device according to Embodiment 1 of the present invention. An information collection device in FIG. 1 includes an image capturing device 101, an information storage unit 102, a sensor group 103, a sensor control unit 104, a navigation device 105, an information processing unit 106, a database processing unit 107, a collected information DB (database) 108, a data life table 109, a data life determination unit 110, a similarity degree determination unit 111, and a request estimation unit 112, and these are mounted on a vehicle 100.

<Outline of Components>

The image capturing device 101 is mounted on the vehicle 100 and captures an image of at least one of the inside and the outside of the vehicle 100. The information storage unit 102 temporarily stores an image capturing result such as an image captured by the image capturing device 101. The sensor group 103 includes a plurality of sensors of the vehicle that collect (detect) sensor information. The sensor control unit 104 controls the sensor group 103. The navigation device 105 collects information used by the navigation device 105 or information generated by the navigation device 105.

The information processing unit 106 generates data in a format to be stored in the collected information DB 108, from the image capturing result stored in the information storage unit 102, the sensor information collected by the sensor group 103, and the navigation information collected by the navigation device 105. That is, the information processing unit 106 being an acquisition unit acquires data including an image of at least one of the inside and the outside of the vehicle 100. In Embodiment 1, this data further includes the sensor information and the navigation information. Hereinafter, the information processing unit 106 acquires data including an image, the sensor information, and the navigation information as acquired-data.

The collected information DB 108 being a database saves (retains, stores) the acquired-data acquired by the information processing unit 106 as saved-data.

The similarity degree determination unit 111 obtains a degree of similarity between the acquired-data and the saved-data based on the characteristics of the acquired-data and the characteristics of the saved-data, and generates (modifies) a link that associates the acquired-data and the saved-data based on the similarity degree.

The request estimation unit 112 generates (modifies) a link that associates the saved-data when the saved-data is read, and estimates a future request for the saved-data.

The data life determination unit 110 being a time limit determination unit determines the storage time limit of the saved-data in the collected information DB 108 on a link-by-link basis based on the generation result in the similarity degree determination unit 111 and the estimation result in the request estimation unit 112.

The data life table 109 being a time limit table saves (retains, stores) the storage time limit determined in the data life determination unit 110 on a link-by-link bases. The storage time limit in the data life table 109 is sequentially updated by the data life determination unit 110.

The database processing unit 107 manages the saved-data in the collected information DB 108 based on the storage time limit determined in the data life determination unit 110. In Embodiment 1, the database processing unit 107 deletes the saved-data in the collection information DB 108 based on the storage time limit determined by the data life determination unit 110 and stored in the data life table 109.

<Detail Description of Components>

The image capturing device 101 is a unit that is mounted on the vehicle 100 and captures an image. The image capturing device 101 captures images of the inside or outside or both the inside and outside of the vehicle 100. Noted that, the image may be a motion video or a still image obtained by extracting a part of the image. Also, the image may include audio information.

The information storage unit 102 temporarily stores an image captured by the image capturing device 101.

The sensor group 103 includes various sensors mounted on the vehicle 100, such as an acceleration sensor, a water temperature sensor, and a radar sensor, and collects (detects) various information such as information on the vehicle 100 during driving as sensor information.

The sensor control unit 104 converts the sensor information collected by the sensor group 103 into data in a format that can be read by subsequent components.

The navigation device 105 acquires route information, traffic information, operation information indicating an operation on the navigation device 105, and the like as the navigation information.

The information processing unit 106 associates the image stored in the information storage unit 102 with the sensor information and the navigation information acquired by the sensor control unit 104 and the navigation device 105 which are acquired at the same time as the image. Accordingly, the information processing unit 106 generates data in a format to be stored in the collected information DB 108. At this time, the information processing unit 106 may not only perform information synchronization but also perform conversion processing such as creating a map from the point group information acquired from the radar sensor.

<Database Processing Unit>

The database processing unit 107 manages the collected information DB 108.

FIG. 2 is a flowchart illustrating the operation of the database processing unit 107. In Step S1, the database processing unit 107 determines the type of processing that the database processing unit 107 should perform on the collected information DB 108. If the process is writing new data, the process proceeds to Step S2. If the process is reading data, the process proceeds to Step S4. If the process is the management process of the collected information DB 108, the process proceeds to Step S6. If the process is none of these, the process ends without executing anything.

In Step S2, the database processing unit 107 acquires the acquired-data, which is new data, from the information processing unit 106. In Step S3, the database processing unit 107 stores the acquired-data in the collected information DB 108 as saved-data. Then, the process ends.

In Step S4, the database processing unit 107 searches the collected information DB 108 for saved-data the user desires to refer to. In Step S5, the database processing unit 107 reads and outputs the search result such as the searched saved-data. The saved-data output by the database processing unit 107 is displayed on, for example, a display device (not shown) and is referred to by the user. Then, the process ends.

In Step S6, the database processing unit 107 collates the saved-data in the collected information DB 108 with the storage time limit saved in the data life table 109. In Step S7, the database processing unit 107 deletes the saved-data whose life has expired in the collected information DB 108 based on the collation result.

<Collected Information DB>

Under the control of the database processing unit 107, the collected information DB 108 stores the acquired-data from the information processing unit 106 as saved-data. FIGS. 3 and 4 are tables illustrating an example of contents stored in the collected information DB 108.

In the table of FIG. 3, image IDs and image file names associated with the image IDs are stored. In addition to this, in the table of FIG. 3, photographer IDs and destinations are also stored as semi-permanent information per image.

In the example of FIG. 3, although an image ID is represented in numbers, it is not limited thereto as long as it is a unique ID for one image, and for example, a character string in alphabet or the like may be used. In the example of FIG. 3, although the image file format is MP4, the file format is not limited thereto, and other commonly used image or image file formats such as Audio Video Interleave (AV) may be adopted. Also, although an example in which a destination is stored as a facility name is illustrated in FIG. 3, a destination may be stored as location information such as latitude and longitude, when information about a name of a destination cannot be obtained.

The information stored in the table of FIG. 3 includes the image IDs, the image file names, the photographer IDs, and the destinations. However, the information stored in the table of FIG. 3 is not limited thereto, and semi-permanent information per image among the information that can be acquired by the sensor group 103 and the navigation device 105 or, among the information derived from the information of the sensor group 103 and the navigation device 105 may be adoptable. For example, the information stored in the table of FIG. 3 may be information unique to each vehicle, such as a vehicle registration number, or information unique to each camera, such as a camera manufacturing number.

In the table of FIG. 4, image IDs are stored. In addition to this, in the table of FIG. 4, as variable information whose contents change frequently with the lapse of time per image, time, latitude, longitude, speed, engine speed, altitude, and congestion are also saved.

In the example of FIG. 4, although information is saved every second for the same image, the time interval may be longer or shorter than one second. The information stored in the table of FIG. 4 is the image IDs, time, latitude, longitude, speed, engine speed, altitude, and congestion. However, the information stored in the table of FIG. 4 is not limited thereto, and variable information that changes moment by moment among the information that can be acquired by the sensor group 103 and the navigation device 105 or, among the information derived from the information of the sensor group 103 and the navigation device 105 may be adoptable.

Both the table of FIG. 3 and the table of FIG. 4 as described above have the image IDs; therefore, the database processing unit 107 can refer to the information in FIG. 3 and the information in FIG. 4 in association with each other by the image IDs. Although an example in which the contents stored in the collected information DB 108 are divided into two tables and stored has been described above, Embodiment 1 is not limited thereto. For example, the contents stored in the collected information DB 108 may be stored in one table, or stored in three or more tables such that the contents related to power is separated into another table, for example.

<Similarity Degree Determination Unit>

The similarity degree determination unit 111 calculates a degree of similarity between the acquired-data and the saved-data based on the characteristics of the acquired-data acquired by the information processing unit 106 and the characteristics of the saved-data saved in the collected information DB 108. Then, the similarity degree determination unit 111 outputs, to the data life determination unit 110, a link in which the acquired-data is associated with the saved-data whose degree of similarity is equal to or higher than a threshold and is highest.

Figure 5:
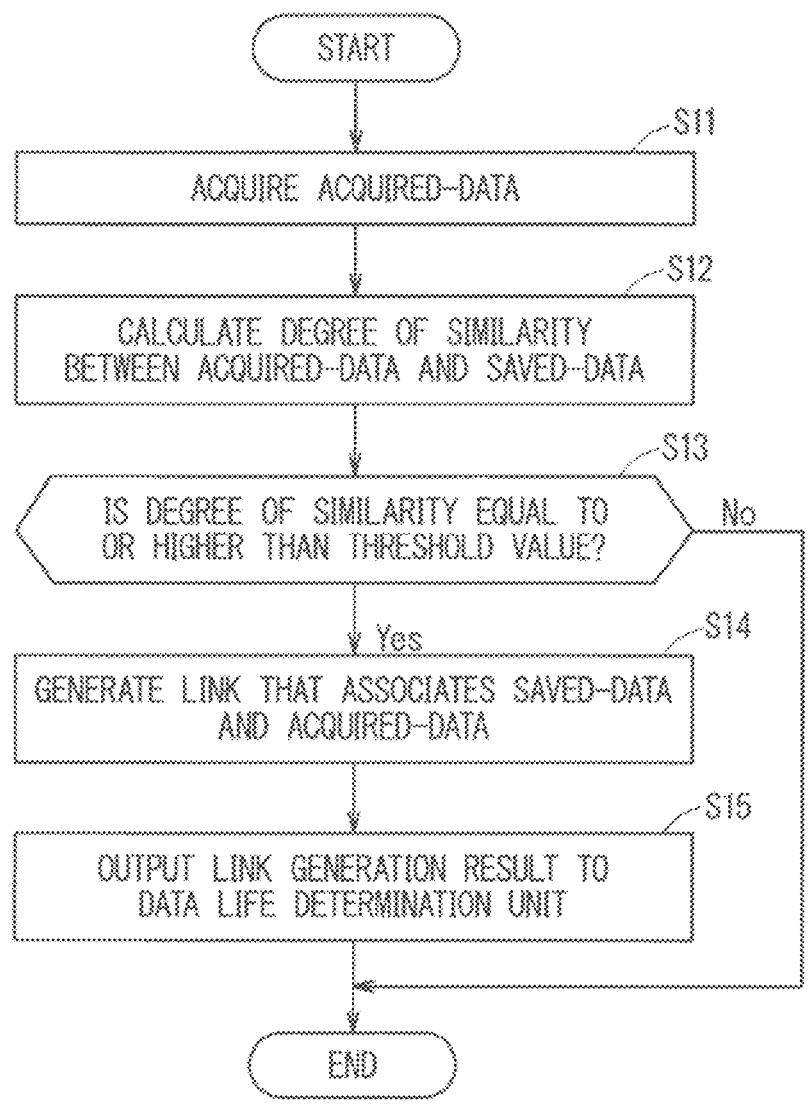
FIG. 5 A flowchart illustrating the operation of a similarity degree determination unit according to Embodiment 1.

FIG. 5 is a flowchart illustrating the operation of the similarity degree determination unit 111. In Step S11, the similarity degree determination unit 111 acquires the acquired-data, which is new data, from the information processing unit 106.

In Step S12, the similarity degree determination unit 111 calculates the degree of similarity between the acquired-data and the saved-data saved in the collected information DB 108. For example, the similarity degree determination unit 111 calculates the degree of similarity from the number of matching items and the Euclidean distance between data based on an object in the image, a capturing position, a capturing date, photographer attributes, sensor information, navigation information and the like. Obtaining the Euclidean distance alone leaves differences in the ordering for each type of information; therefore, information is standardized into a range of values that can be compared between different types of information, for example, a scale of 0 to 1.

In Step S13, the similarity degree determination unit 111 determines whether or not the highest degree of similarity among the degrees of similarity calculated for each saved-data is equal to or higher than a threshold value. When it is determined that the highest degree of similarity is equal to or higher than the threshold, the process proceeds to Step S14, and when it is determined that the highest degree of similarity is lower than the threshold, the process ends.

In Step S14, the similarity degree determination unit 111 generates a link that associates the saved-data of the highest degree of similarity with the acquired-data.

In Step S15, the similarity degree determination unit 111 outputs link information indicating the link generation result to the data life determination unit 110. Then, the process ends. Therefore, if it is determined in Step S13 that the highest degree of similarity is lower than the threshold value, no link is generated and no link information is output. The threshold value in Step S13 may be invariable or variable. Further, the threshold value may be statistically determined by using a known statistical method such as machine learning.

Figure 6:
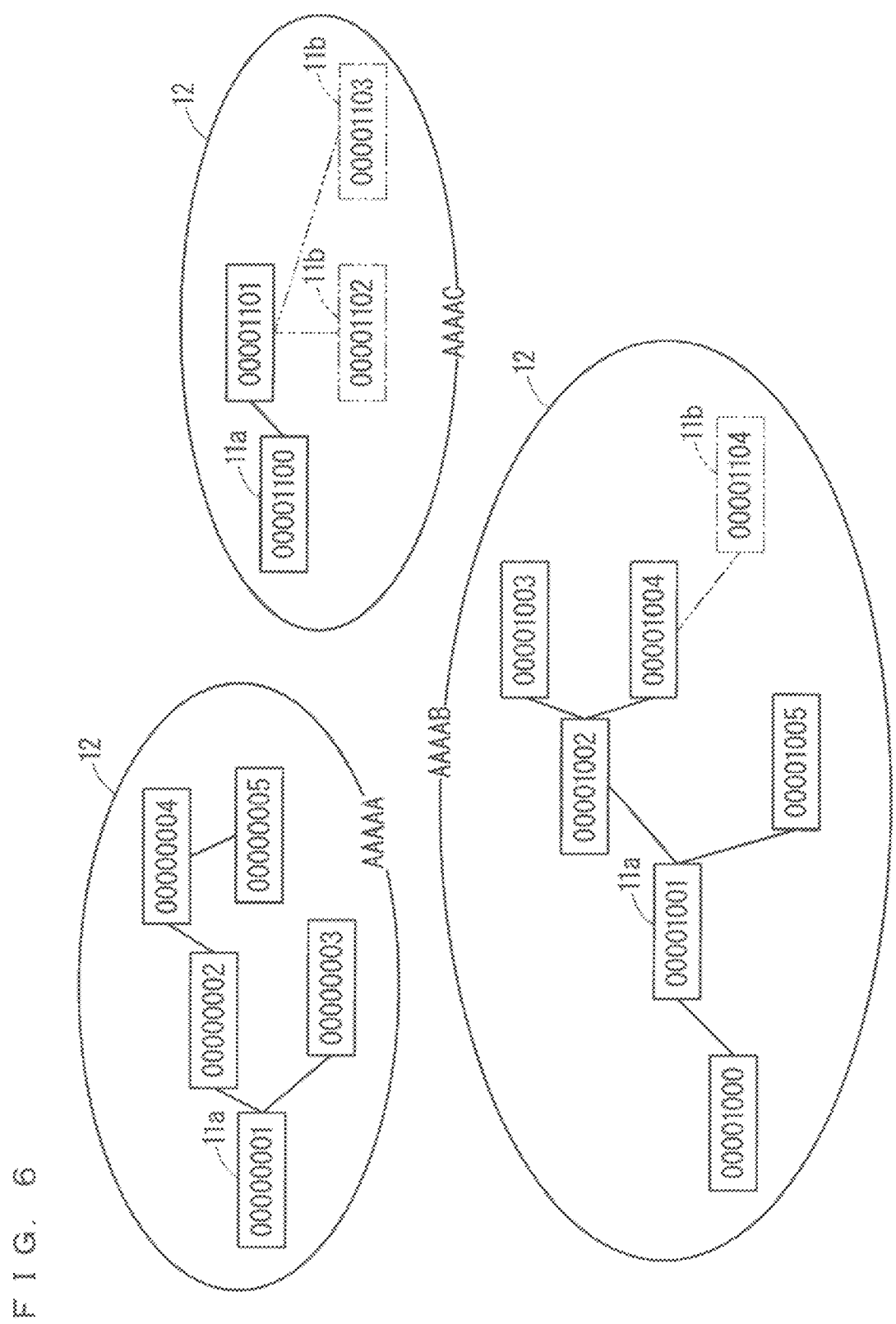
FIG. 6 A diagram illustrating an example in which the similarity degree determination unit according to Embodiment 1 generates links.

FIG. 6 is a diagram illustrating an example in which the similarity degree determination unit 111 generates links. One rectangular frame node indicated with a solid line corresponds to one piece of saved-data 11a, one rectangular frame node indicated with a two-dot chain line corresponds to one piece of acquired-data 11b, and an elliptical frame corresponds to a link 12 which associates these pieces of data. In the example of FIG. 6, the link 12 associates the saved-data 11a with the acquired-data 11b by associating the saved-data 11a and the acquired-data image 11b by the image ID. This is because the image ID serves as the primary key in the table illustrated in the example of the collected information DB 108. Depending on the table configuration of the collected information DB 108, the link may associate the saved-data and the acquired-data by information other than the image ID.

In FIG. 6, the saved-data 11a represented by the solid line nodes forms three links "AAAAA", "AAAAB", and "AAAAC". At this time, when the acquired-data 11b "00001102", "00001103", and "00001104" represented by the two-dot chain line nodes are input to the similarity degree determination unit 111, the similarity degree determination unit 111 calculates degrees of similarity between the saved-data 11a and the acquired-data 11b. Then, the similarity degree determination unit 111 associates the acquired-data 11b with the saved-data 11a whose degree of similarity is equal to or higher than the threshold value and is the highest, thereby partially modifying the link 12 to generate a new link 12. In the example of FIG. 6, one piece of acquired-data 11b is added to the link 12 denoted "AAAAB", and two pieces of acquired-data 11b are added to the link 12 denoted "AAAAC". The similarity degree determination unit 111 outputs link information indicating the link generation result to the data life determination unit 110.

The similarity degree determination unit 111 may collectively calculate the degrees of similarity of a plurality of pieces of acquired-data, or may sequentially calculate the degree of similarity each time one piece of acquired-data is input. Although the target for calculating the degree of similarity may be all saved-data existing in the collected information DB 108, the target may be a representative data which is one piece of saved-data selected from each link to reduce the amount of calculation, As the representative data, one piece of saved-data added lately or added first may be selected, or the one piece of saved-data that is closest to the mean value or median value among the saved-data belonging to the link may be selected.

<Request Estimation Unit>

The request estimation unit 112 generates a link that associates the saved-data when the user performs an operation of reading the saved-data, and outputs the result of estimating a future request for the saved-data to the data life determination unit 110.

Figure 7:
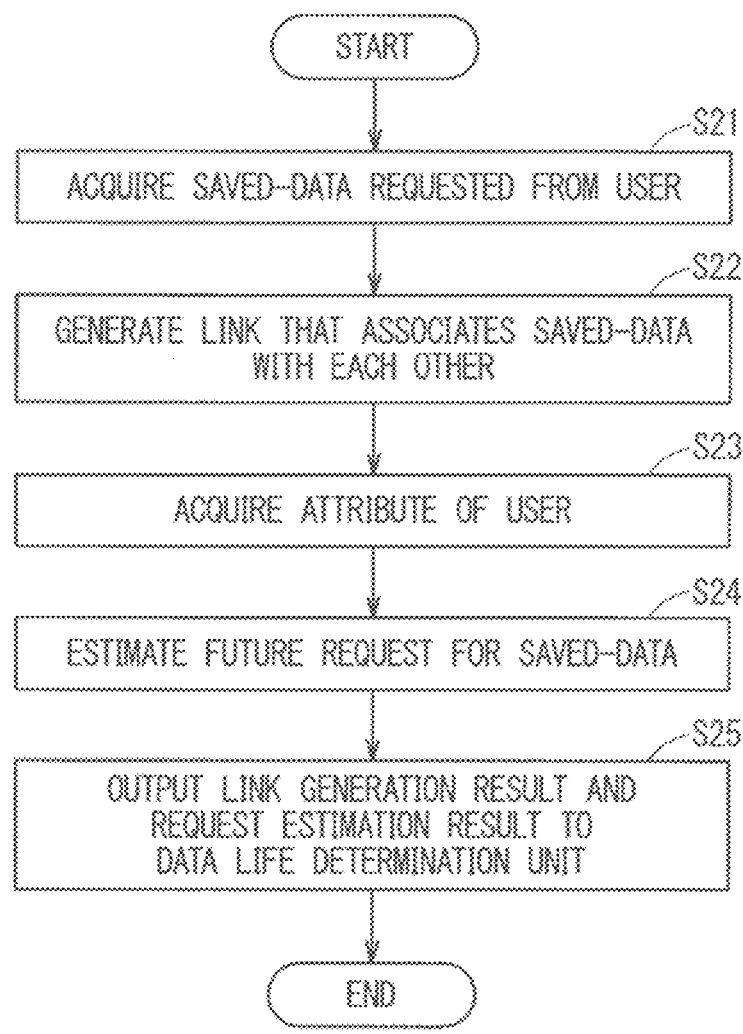
FIG. 7 A flowchart illustrating the operation of a request estimation unit according to Embodiment 1.

FIG. 7 is a flowchart illustrating the operation of the request estimation unit 112. In Step S21, the request estimation unit 112 acquires the saved-data requested to be read from the user.

In Step S22, the request estimation unit 112 generates a link that associates the saved-data with each other.

In Step S23, the request estimation unit 112 acquires an attribute of the user. The attribute of the user is, for example, the purpose of reading or referring to the saved-data. Note that the request estimation unit 112 may obtain the attribute of the user input by the user, or obtain the attribute of the user estimated using a statistical method such as known machine learning for the saved-data.

In Step S24, the request estimation unit 112 estimates a future request for the saved-data based on the user attribute. For example, traffic congestion is a phenomenon of several hours at most. Therefore, when the attribute of the user is for the purpose of knowing the traffic congestion state, that is, when the saved-data is read in order for the user to know the traffic congestion state, the request estimation unit 112 estimates that the request for the saved-data is a request that disappears as soon as the traffic congestion is relieved, or a request that disappears when the traffic congestion is relieved.

In Step S25, the request estimation unit 112 outputs the link generation result in Step S22 and the request estimation result in Step S24 to the data life determination unit 110. Then, the process ends.

Figure 8:
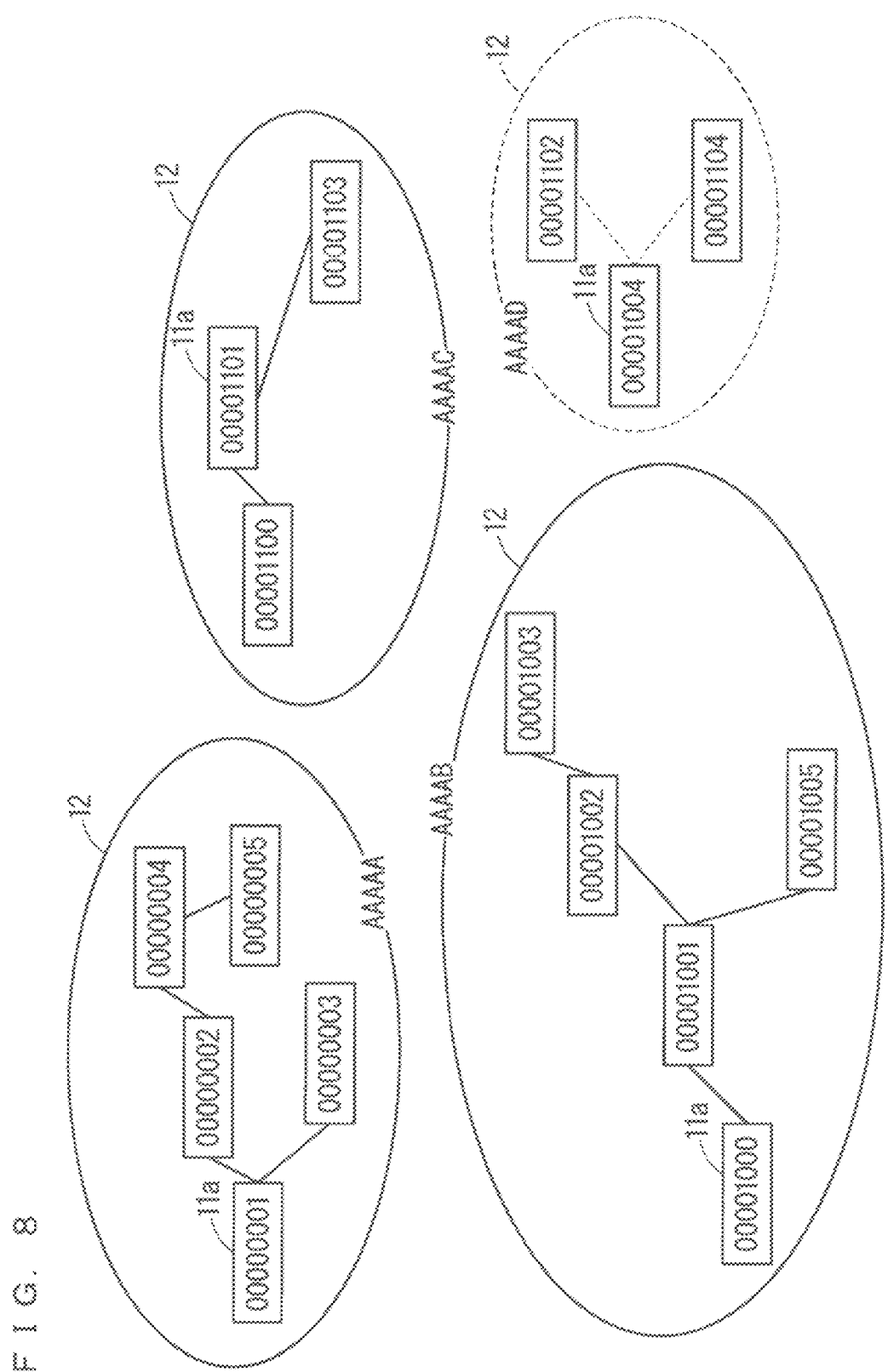
FIG. 8 A diagram illustrating an example in which the request estimation unit according to Embodiment 1 generates links.

FIG. 8 is a diagram illustrating an example in which the request estimation unit 12 generates links. Assuming the operation in which, among the saved-data 11a in FIG. 6, the user refers to the saved-data 11a whose image IDs are "00001004", "00001102", and "00001104" is performed. In this case, the request estimation unit 112 partially modifies the link 12 to generate a new link 12 by associating the three saved-data 11a with each other.

Then, the request estimation unit 112 estimates future requests for the saved-data 11a belonging to the new link 12. As in the above example, when the saved-data 11a are referred to in order to confirm the traffic congestion state, the request estimation unit 112 estimates that a request for the saved-data 11a belonging to the new link 12 is a request that will disappear after a few hours. Further, for example, when the saved-data 11a are used in an investigation on a traffic accident or the like, the request estimation unit 112 estimates that a request for the saved-data 11a belonging to the new link 12 is a long-time request that will last for several years or so. Here, although an example has been described in which the request estimation unit 112 estimates a request based on a static standard set at the time of designing, Embodiment 1 is not limited thereto. For example, the request estimation unit 112 may estimate a request based on a known statistical method such as machine learning. An estimation standard may be dynamically set by online learning.

<Data Life Determination Unit>

In the data life determination unit 110, based on the output from the similarity degree determination unit 111 and the output from the request estimation unit 112, the storage time limits of the saved-data in the collected information DB 108 are determined on a link-by-link basis.

Figure 9:
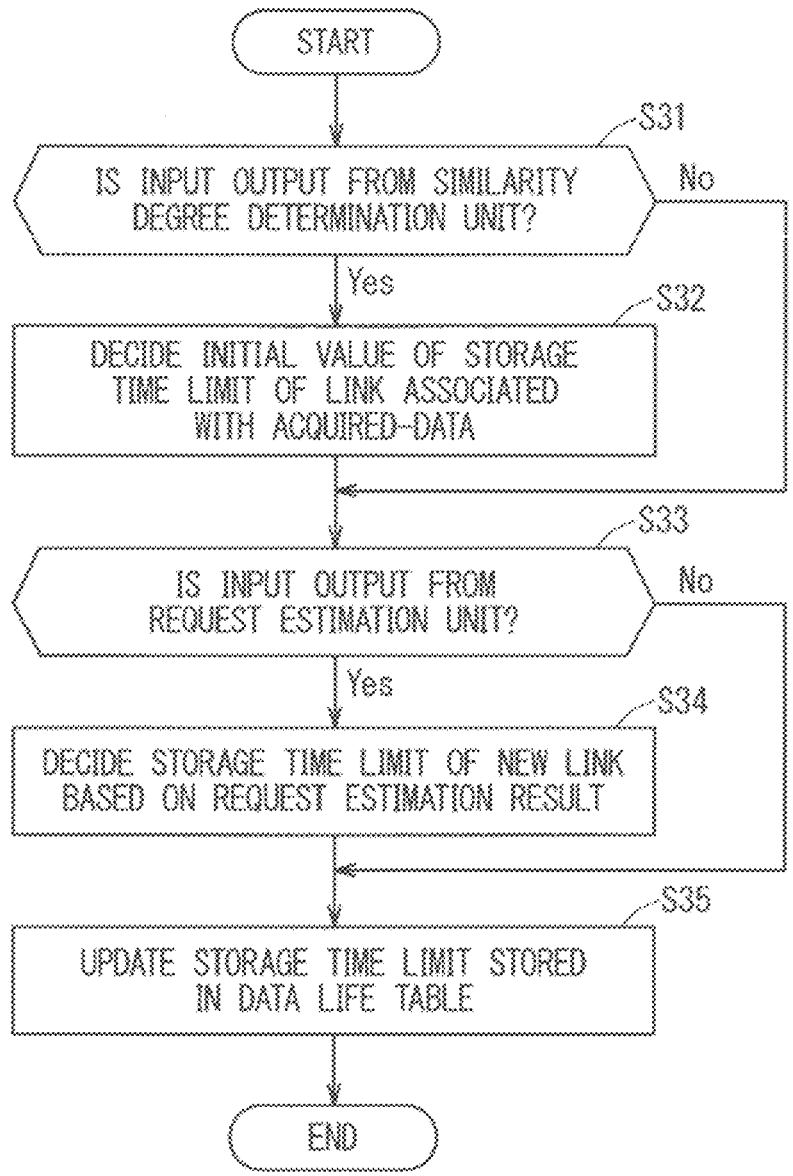
FIG. 9 A flowchart illustrating the operation of a data life determination unit according to Embodiment 1.

FIG. 9 is a flowchart illustrating the operation of the data life determination unit 110. In Step S31, the data life determination unit 110 determines whether the input to the data life determination unit 110 is the output from the similarity degree determination unit 111. If it is determined that the output is from the similarity degree determination unit 111, the process proceeds to Step S32, and if it is determined that the output is not from the similarity degree determination unit 111, the process proceeds to Step S33.

In Step S32, the data life determination unit 110 determined an initial value of the storage time limit (life) of the link associated with the acquired-data. For example, extending the life of a link to which acquired-data is added by one year. Then, the process proceeds to Step S33.

In Step S33, the data life determination unit 110 determines whether the input to the data life determination unit 110 is the output from the request estimation unit 112. If it is determined that the output is from the request estimation unit 112, the process proceeds to Step S34, and if it is determined that the output is not from the request estimation unit 112, the process proceeds to Step S35.

In Step S34, based on the request estimation result of the saved-data belonging to the new link generated by the request estimating unit 112, the data life determination unit 110 determined the storage time limit of the new link. For example, if the request is a request for traffic congestion or the like that disappears after several hours, the data life determination unit 110 may set the life of the link corresponding to the traffic congestion to one day. Further, for example, when the information collection device according to Embodiment 1 can receive the notification of the information on relieving the traffic congestion, the time at which the notification is received may be set to the life of the link corresponding to the traffic congestion. Thereafter, the process proceeds to Step S35.

In Step S35, the data life determination unit 110 updates the storage time limit stored in the data life table 109 according to the determination results in Steps S32 and S34. When Step S35 is performed without passing through Step S32 or Step S34, the storage time limit in the data life table 109 is not changed. However, this is not the case when the capacity of the storage area of the collected information DB 108 is tight. For example, in order to secure the capacity of a storage area which is tight, the data life determination unit 110 may set, for a link whose life is within a certain date, the lives of the saved-data belonging to the link to the current time. Alternatively, the lives of the saved-data belonging to the link may be set to the current time in order from the link whose life is close to the current time so that the saved-data are within a certain number. Then, the process ends.

<Data Life Table>

The data life table 109 stores the storage time limits (lives) determined by the data life determination unit 110 on a link-by-link bases. The storage time limits stored in the data life table 109 are sequentially updated by the data life determination unit 110. FIGS. 10 and 11 are tables illustrating an example of the contents stored in the data life table 109.

The information in the table in FIG. 10 and the information in the table in FIG. 11 are associated with each other by an image IDs. As illustrated in FIG. 10, the lives of saved-data are managed on a link-by-link basis. When the time described as the life is older than the current time, the saved-data are deleted by the database processing unit 107. Although FIG. 10 illustrates an example in which the data life table 109 manages only the lives of each link, Embodiment 1 is not limited thereto. For example, the data life table 109 may manage information regarding acquired-data added to the link, information regarding the representative data described above, and the like. In FIG. 11, the links generated (modified) by the similarity degree determination unit 111 and the request estimation unit 112 are managed. In the example of FIG. 11, saved-data 11a having image IDs "00000001", "00000002", and "00000004" are associated with each other to form a link with a link ID "AAAAA".

In the example of FIG. 10 and FIG. 11, although an example in which the above contents are divided into two tables and stored has been described, Embodiment 1 is not limited thereto, and contents may be stored in one table, or, contents may be divided and stored in three or more tables.

Summary of Embodiment 1

According to the information collection device of Embodiment 1 configured as described above, the data stored in the collected information DB 108 is managed based on the characteristics of the information per se and the estimation result of the future request from the user on a link-by-link basis. This ensures to suppress the storage of unnecessary data and provide an information collection device having an efficient data management function.

Further, the conventional information collection device does not have a function of changing the storage time limit of data that is once set. Whereas, in Embodiment 1, the data life determination unit 110 has a function capable of shortening the storage time limit; therefore, more active deletion of excessive saved-data than the conventional devices is ensured, and the effect of avoiding tightening of capacity of the storage area can be obtained. Further, in Embodiment 1, the data life determination unit 110 has a function capable of extending the storage time limits of the saved-data required in the future; therefore, the effect of protecting saved-data which are supposed to be deleted with the conventional devices.

In the above description, although the database processing unit 107 deletes saved-data in the collected information DB 108 based on the storage time limit stored in the data life table 109, Embodiment 1 is not limited thereto. For example, although the database processing unit 107 may reduce saved-data in the collected information DB 108 based on the storage time limit stored in the data life table 109. Reducing the saved-data includes compressing the size of the saved-data, for example, reducing the frame rate and reducing the resolution of the image. At this time, the database processing unit 107 may separately set the life of the compressed data that is the compressed saved-data, and delete the compressed data from the compressed data whose life has expired.

Embodiment 2

Figure 12:
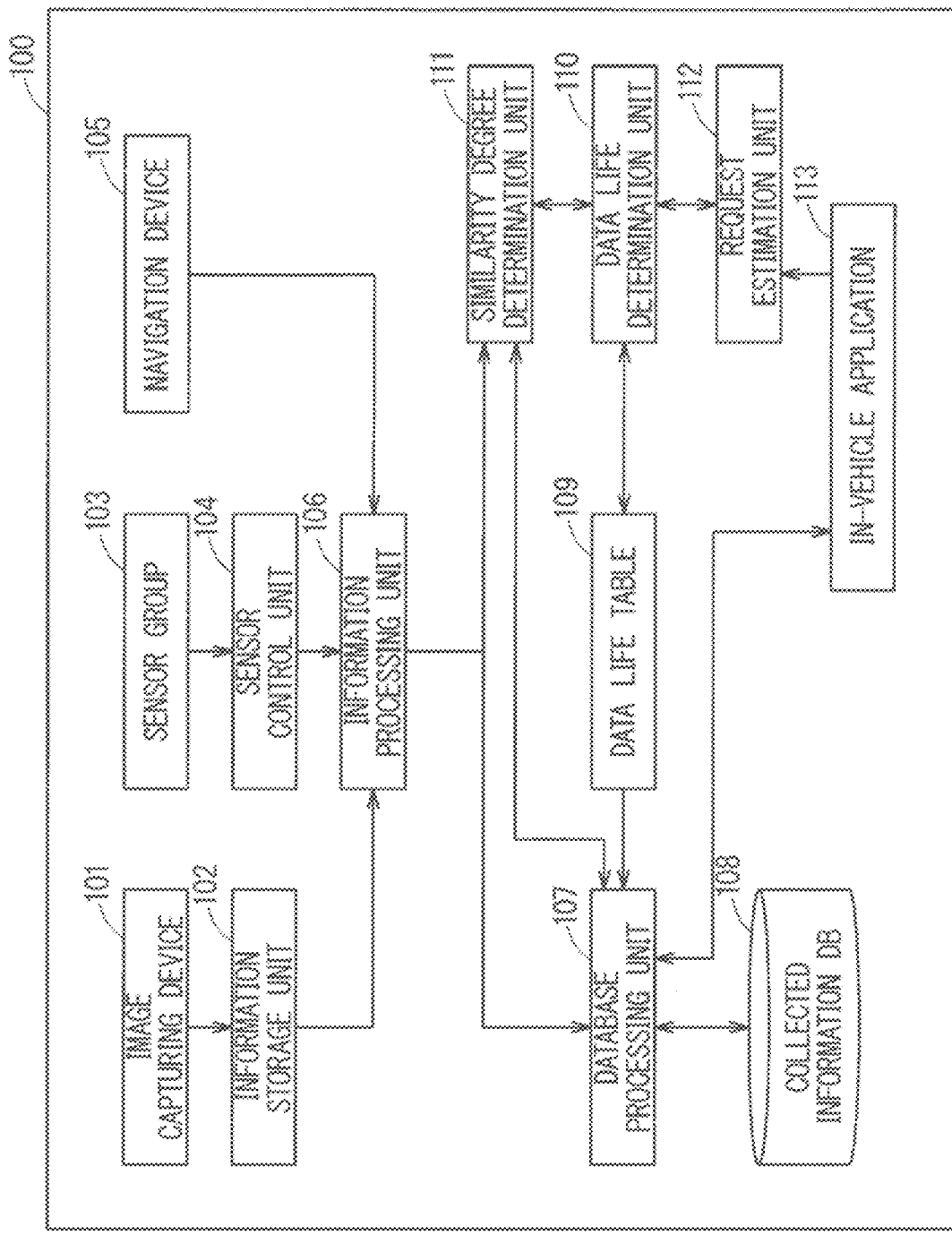
FIG. 12 A block diagram illustrating a configuration of an information collection device according to Embodiment 2.

FIG. 12 is a block diagram illustrating a configuration of an information collection device according to Embodiment 2 of the present invention. Embodiment 2 has a configuration in which an in-vehicle application 113 is added to the configuration of Embodiment 1 (FIG. 1). Hereinafter, of the components according to Embodiment 2, the same or similar reference numerals are given to the same or similar components as those described above, and different components will be mainly described.

The in-vehicle application 113 is an application that is installed in a vehicle and operates in the navigation device 105 and the like, and is, for example, an autonomous parking function application. When using saved-data in the collected information DB 108, the in-vehicle application 113 gives the saved-data and the purpose of use thereof to the request estimation unit 112. The in-vehicle application 113 includes at least one application.

The request estimation unit 112 generates a link that associates the saved-data based on the attribute of the in-vehicle application 113 being an application that uses the saved-data in the vehicle 100, and estimates a future request for the saved-data. The attribute of the in-vehicle application 113 indicates here is, for example, information on use (reading) of the saved-data in the in-vehicle application 113. The use of the saved-data is information unique to each application, for example, information statically determining whether or not the same saved-data is referenced to again.

Figure 13:
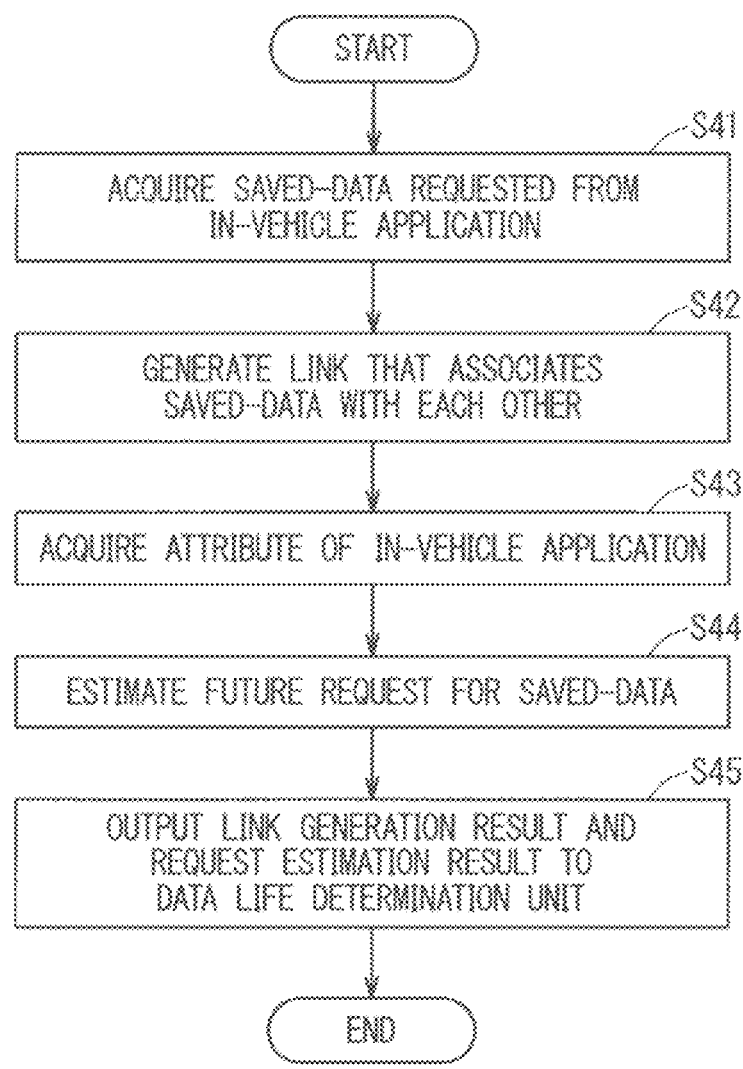
FIG. 13 A flowchart illustrating the operation of a request estimation unit according to Embodiment 2.

FIG. 13 is a flowchart illustrating the operation of the request estimation unit 112. In Step S41, the request estimation unit 112 acquires the saved-data requested from the in-vehicle application 113 to be read for the use thereof.

In Step S42, the request estimation unit 112 generates a link that associates the saved-data with each other.

In Step S43, the request estimation unit 112 acquires an attribute of the in-vehicle application 113.

In Step S44, the request estimation unit 112 estimates a future request for the saved-data based on the attribute of the in-vehicle application 113. In Embodiment 2, the in-vehicle application 113 includes a plurality of applications, and the request estimation unit 112 estimates the request by totalizing the attributes of the plurality of applications.

For example, assuming a configuration in which the in-vehicle application 113 includes an omnidirectional image application that combines images of in-vehicle cameras at the time of parking to generate an omnidirectional image, and a close call application capable of recording an image at the time of occurrence of close call and checking the image at any time. In this configuration, when the vehicle 100 moves backward to park, the omnidirectional image application is activated and the driver is provided with the image. At this time, if a child jumps into the road, the close call application is also activated to record the image and information. That is, the same saved-data is used and referenced by the two applications.

The saved-data of the image used in the omnidirectional image application is the data that is required only at the time of parking operation; therefore, the request for the use of the saved-data is considered as a short-term request that will not be made for a long term in the future. Meanwhile, the saved-data of the image used in the close call application is the data that is required for checking at arbitrary timing; therefore, the request for the use of the saved-data is considered as a request that will be made for a long term in the future. Therefore, in order not to cause a discrepancy in any of the applications, the request estimation unit 112 estimates the request by setting the standard to the application having the longer period for the request to be made, which is the close call application in the above example.

In Step S45, the request estimation unit 112 outputs the link generation result in Step S42 and the request estimation result in Step S44 to the data life determination unit 110. Then, the process ends.

Summary of Embodiment 2

According to the information collection device of Embodiment 2 configured as described above, the request is estimated based on the attribute of the in-vehicle application 113; therefore, obtaining a more appropriate estimation result for the request than that with Embodiment 1 is ensured. Specifically, as described above, when considering that a plurality of applications having different attributes refer to the same saved-data, the saved-data that is necessary for the future may possibly be deleted immediately in Embodiment 1 depending on the timing of the request estimation process. Whereas, in Embodiment 2, as described above, the estimation of the request by totalizing the attributes of the plurality of applications; therefore, the probability of the above to happen can be reduced.

Embodiment 3

Figure 14:
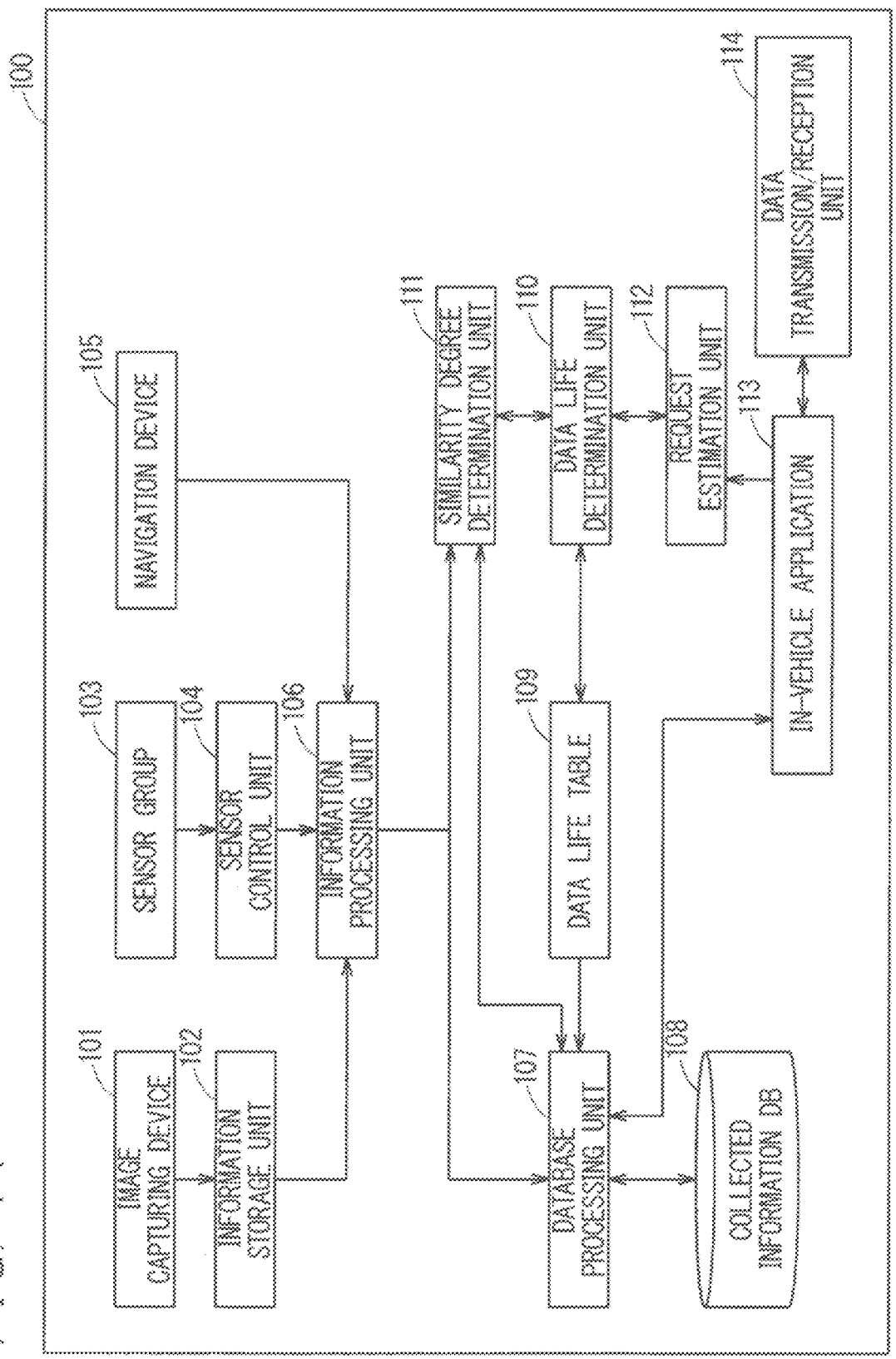
FIG. 14 A block diagram illustrating a configuration of an information collection device according to Embodiment 3.

FIG. 14 is a block diagram illustrating a configuration of an information collection device according to Embodiment 3 of the present invention. Embodiment 3 has a configuration in which a data transmission/reception unit 114 is added to the configurations of Embodiments 1 and 2 (FIG. 1 and FIG. 12). Hereinafter, of the components according to Embodiment 3, the same or similar reference numerals are given to the same or similar components as those described above, and different components will be mainly described. In the following description, the vehicle 100 of interest may be referred to as "subject vehicle", and the other vehicles 100 may be referred to as "other vehicle". In addition, in the following description, the description that the information collection device of the vehicle performs an operation such as communication may also be described in the description that the vehicle performs an operation such as communication.

The data transmission/reception unit 114 being a communication unit of the vehicle 100 communicates saved-data with the outside of the vehicle 100. For example, the data transmission/reception unit 114 of the subject vehicle transmits saved-data of the subject vehicle to the other vehicle and receives saved-data of the other vehicle by communicating with the other vehicle equipped with the same on-vehicle application 113 as the on-vehicle application 113 of the subject vehicle.

According to such a configuration, the database processing unit 107 of the subject vehicle refers to the saved-data stored in the collected information DB 108 of the other vehicle via the data transmission/reception unit 114 and the in-vehicle application 113. Alternatively, the database processing unit 107 of the subject vehicle provides the other vehicle with the saved-data stored in the collected information DB 118 of the subject vehicle via the data transmission/reception unit 114 and the in-vehicle application 113.

Although the case where the in-vehicle application 113 of the subject vehicle and the in-vehicle application 113 of the other vehicle are the same has been described here, Embodiment 3 is not limited thereto, and both applications need only be compatible with each other. If the other vehicle only needs to receive the saved-data of the subject vehicle, the other vehicle may only include the on-vehicle application 113 and the data transmission/reception unit 114.

If the capacity of the storage area of the collected information DB 108 of the subject vehicle is tight, the information collection device of the subject vehicle may acquire the available capacity of the collected information DB 108 of the other vehicle with which communication is established, and transfer the saved-data of the subject vehicle and the life information thereof to the collected information DB 108 of the other vehicle within a range not exceeding the available capacity. Alternatively, the information collection device of the subject vehicle copies an important saved-data stored in the information collection device of the subject vehicle in the other vehicle and uses the copied saved-data in the other vehicle as a backup data.

Summary of Embodiment 3

According to the information collection device of Embodiment 3 configured as described above, the saved-data is communicated with the outside of the vehicle 100. According to such a configuration, for example, saved-data that has never been referenced by the subject vehicle can be referenced in the other vehicle, so that effective use of the saved-data is ensured. In addition, the saved-data can be transmitted to the other vehicle when the available capacity of the subject vehicle is insufficient; therefore, even if the originally necessary saved-data is deleted in the subject vehicle, the subject vehicle can receive the saved-data from the other vehicle, and as a result, secure data management can be implemented. The data transmission/reception unit 114 may also communicate acquired-data with the outside of the vehicle 100 as is the case with the saved-data.

Embodiment 4

Figure 15:
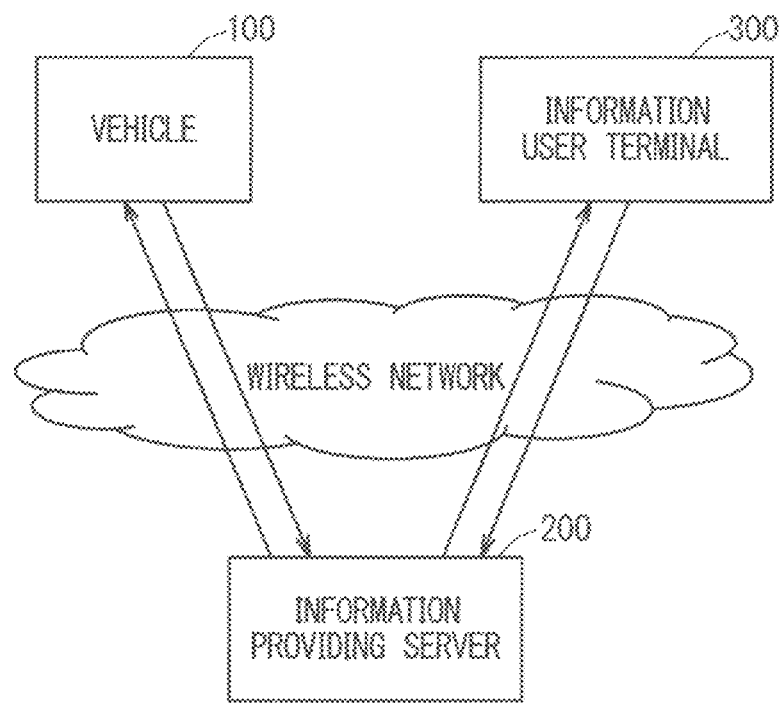
FIG. 15 A block diagram illustrating a configuration of an information collection device according to Embodiment 4.

FIG. 15 is a block diagram illustrating a configuration of an information collection device (information collection system) according to Embodiment 4 of the present invention. Embodiment 4 has a configuration in which an information providing server 200 and an information user terminal 300 are added to the configurations of Embodiments 1, 2, and 3 (FIGS. 1, 12, and 14). Hereinafter, of the components according to Embodiment 4, the same or similar reference numerals are given to the same or similar components as those described above, and different components will be mainly described.

<Information Providing Server>

Figure 16:
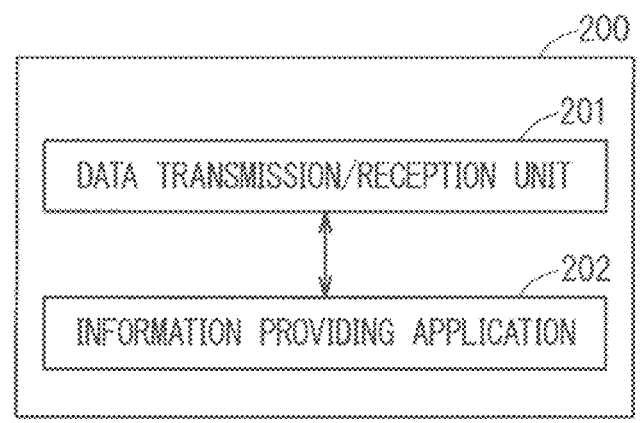
FIG. 16 A block diagram illustrating a configuration of an information providing server according to Embodiment 4.

The information providing server 200 is a server that mediates communication between the subject vehicle and the other vehicle or the information user terminal 300. FIG. 16 is a block diagram illustrating a configuration of an information providing server 200 according to Embodiment 4 of the present invention. The information providing server 200 of FIG. 16 includes a data transmission/reception unit 201 and an information providing application 202.

The data transmission/reception unit 201 establishes communication between the vehicle 100 and the information user terminal 300, and transmits and receives saved-data between the subject vehicle and the other vehicle (not shown) or the information user terminal 300, for example. The information providing application 202 is executed on the information providing server 200 to acquire and provide saved-data based on a data request from the vehicle 100 or the information user terminal 300.

Figure 17:
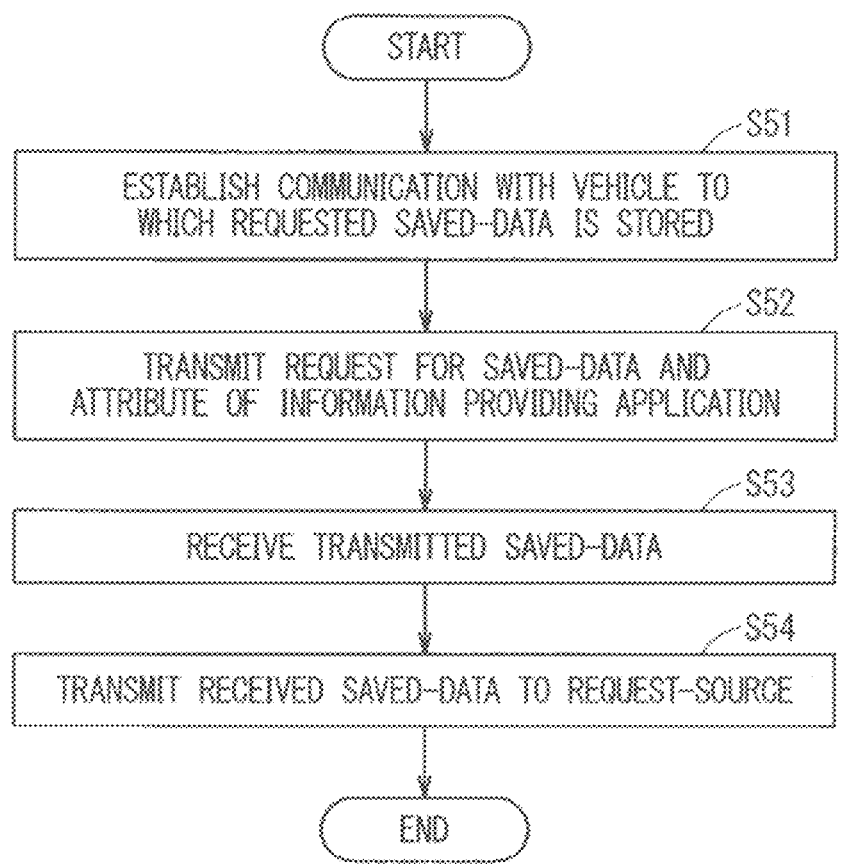
FIG. 17 A flowchart illustrating the operation of an information providing application according to Embodiment 4.

FIG. 17 is a flowchart illustrating the operation of the information providing application 202. In Step S51, the information providing application 202 searches the vehicle 100 or the vehicle 100 to which the saved-data requested by the information user terminal 300 is stored, and establishes communication with the searched vehicle 100.

In Step S52, the information providing application 202 transmits a request for saved-data and an attribute of the information providing application 202 to the in-vehicle application 113 of the vehicle 100 that saves the saved-data.

In Step S53, the information providing application 202 receives the saved-data transmitted from the vehicle 100.

In Step S54, the information providing application 202 transmits the received saved-data to the request-source vehicle 100 or the information user terminal 300.

The information providing application 202 stores the attributes of all information providing applications 304 installed in the information user terminals 300 described later. The attribute of the information providing application 304 here is, for example, information on the use of the saved-data in the information providing application 304. The use of the saved-data is unique to each information providing application 304, and is, for example, information statistically determining whether or not the same saved-data is referenced again.

For example, assuming that the information providing application 304 includes a road management application that is for observing an arbitrary point in the nation and that allows browsing an image captured by an image capturing device of a vehicle traveling at the point. In this case, if all images are stored in all the plurality of vehicles 100 in a region with a large traffic volume, a huge storage area is required. However, if it is sufficient that only one arbitrary vehicle 100 stores the image, the storage time limits of the saved-data in a plurality of vehicles 100 other than the one vehicle 100 can be set shorter, so that effective use of the storage areas of the plurality of vehicles 100 as a whole is ensured.

Although the configuration has been described in which the attributes of the information providing applications 304 are stored in the information providing application 202 of the server 200, and the information providing server 200 integrally controls all the information providing applications 304 exist in the information user terminals 300, Embodiment 4 is not limited thereto. For example, saved-data and its attribute necessary for the information providing application 304 may be designed by developers of the information providing application 304. And, an application that acquires the saved-data from the vehicles and also acquires the attributes of the information providing applications 304 from the information user terminals 300 may be registered in the information providing server 200 as the information providing application 202 by the developers. Then, the information providing application 202 may acquire the attributes of the information providing applications 304 by executing the information providing application 202 for each information providing application 304. That is, a configuration may be adopted in which the information providing application 202 in association with the information providing application 304 existing in the information user terminal 300 may exist in the information providing server 200.

<Information User Terminal>

Figure 18:
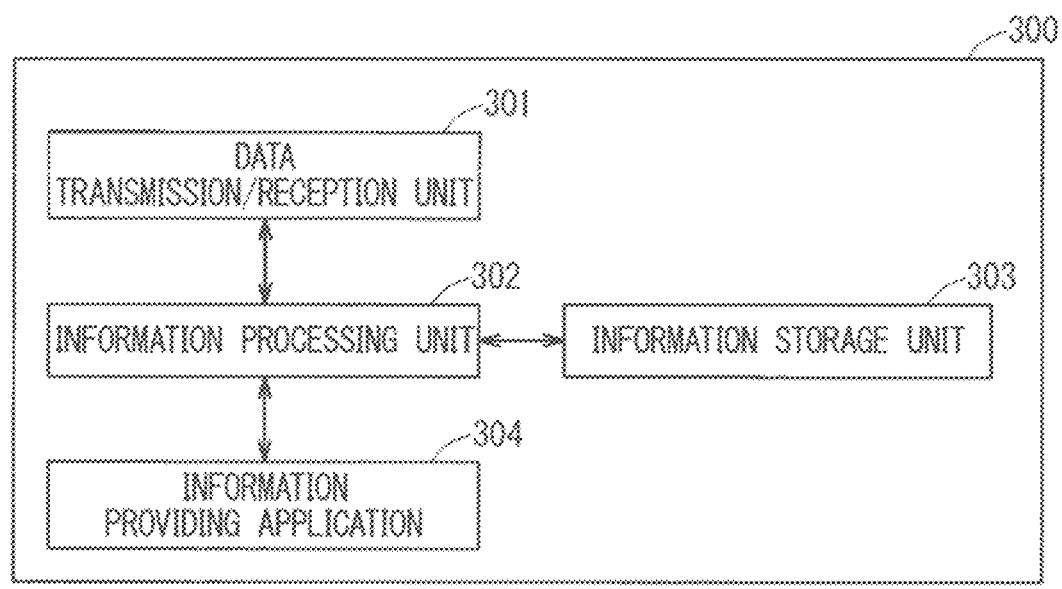
FIG. 18 A block diagram illustrating a configuration of an information user terminal according to Embodiment 4.

The information user terminal 300 is a terminal for using the saved-data collected in the vehicle 100 for a purpose different from that of the in-vehicle application 113. FIG. 18 is a block diagram illustrating a configuration of an information user terminal 300 according to Embodiment 4 of the present invention. For the information user terminal 300, a terminal may be the one installed somewhere, like a personal computer, or may be the one carried by the user, like a smartphone. The information user terminal 300 of FIG. 18 includes a data transmission/reception unit 301, an information processing unit 302, an information storage unit 303, and an information providing application 304.

The data transmission/reception unit 301 receives the saved-data from the vehicle 100 via the information providing server 200. The information processing unit 302 provides the data transmission/reception unit 301 with information regarding the attribute of the information providing application 304 and a necessary saved-data in response to a request for the saved-data from the information providing application 304. Thereby, the information is transmitted to the information providing server 200. Further, the information processing unit 302 converts the saved-data received by the data transmission/reception unit 301 into data in a format suited to be provided to the information providing application 304. The information storage unit 303 stores data that requires partial buffering in the information processing unit 302. The information providing application 304 is an application that operates on the information user terminal 300, and provides and uses the saved-data collected in the vehicle 100. The information providing application 304 includes an application that generates the congestion information of a store based on the image of the saved-data collected by the vehicle 100 when the vehicle 100 travels in front of the desired store in a city and provides the congestion information to the information providing server 200.

<Information Collection Device of Vehicle>

The information collection device of the vehicle 100 collects saved-data for at least one of the in-vehicle application 113 of the subject vehicle, the in-vehicle application 113 of the other vehicle, and the information providing application 304 of the information user terminal 300.

As is the case with Embodiment 2, the request estimation unit 112 generates a link that associates the saved-data based on the attribute of the in-vehicle application 113 of the subject vehicle being an application that uses the saved-data in the vehicle 100, and estimates a future request for the saved-data. Also, the request estimation unit 112 generates a link that associates the saved-data based on the attribute of an application that uses the saved-data outside the subject vehicle, such as the attribute of the in-vehicle application 113 of the other vehicle and the attribute of the information providing application 304, and estimates a future request for the saved-data.

Figure 19:
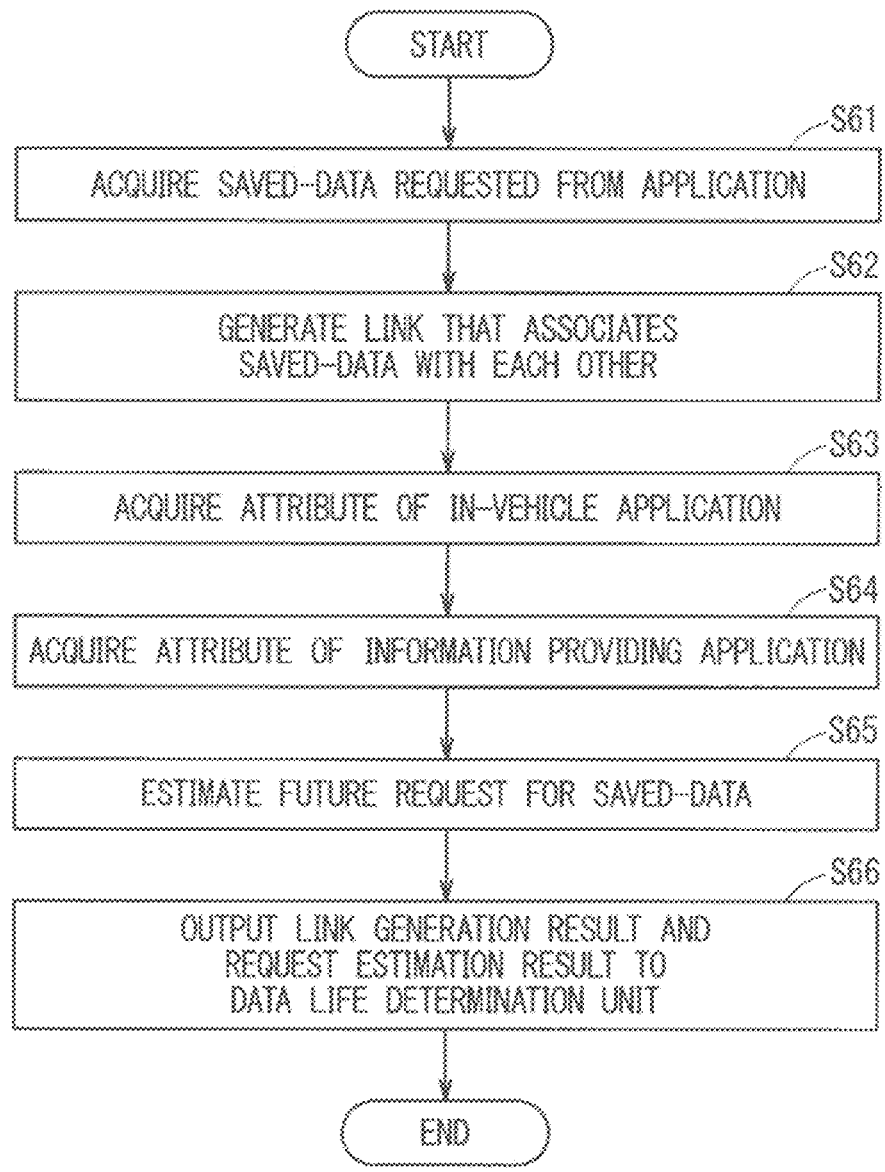
FIG. 19 A flowchart illustrating the operation of a request estimation unit according to Embodiment 4.

FIG. 19 is a flowchart illustrating the operation of the request estimation unit 112. In this operation, no difference lies between the in-vehicle application 113 and the information providing application 304; therefore, both applications are simply described as application in the flowchart of FIG. 19 and the following description.

In Step S61, the request estimation unit 112 acquires the saved-data requested from the application.

In Step S62, the request estimation unit 112 generates a link that associates the saved-data with each other.

In Step S63, the request estimation unit 112 acquires an attribute of the in-vehicle application 113 of the subject vehicle.

In Step S64, the request estimation unit 112 acquires an attribute of the information providing application 202. The information providing application 202 exists outside the subject vehicle; therefore, the application of the information providing application 202 and its attribute can be known only when access to the subject vehicle occurs, that is, when a request is made from the application.

In step S65, the request estimation unit 112 estimates the future request for the saved-data based on the attribute of the in-vehicle application 113 acquired in Step S63 and the attribute of the application acquired in Step S64.

In Step S66, the request estimation unit 112 outputs the link generation result in Step S62 and the request estimation result in Step S65 to the data life determination unit 110. Then, the process ends.

Summary of Embodiment 4

According to the information collection device of Embodiment 4 configured as described above, a request is estimated based on attribute of application that uses the saved-data outside the vehicle 100; therefore, estimating the request based on an attribute of different quality from the in-vehicle application 113 is ensured by the use of the information user terminal 300, for example. In this manner, the request can be estimated based on more attribute data than in Embodiments 1, 2, and 3; therefore, the saved-data can be efficiently managed.

Further, even when the distance between the subject vehicle and the other vehicle is too long to establish direct inter-vehicle communication, data exchange between a plurality of vehicles 100 can be implemented by mediating the information providing server 200. That is, even if the storage area of the collected information DB 108 of the subject vehicle is depleted, the saved-data of the collected information DB 108 can be protected by backing up the saved-data in the collected information DB 108 into the other vehicles in a manner that a plurality of vehicles 100 are used like distributed storage.

Embodiment 5

Figure 20:
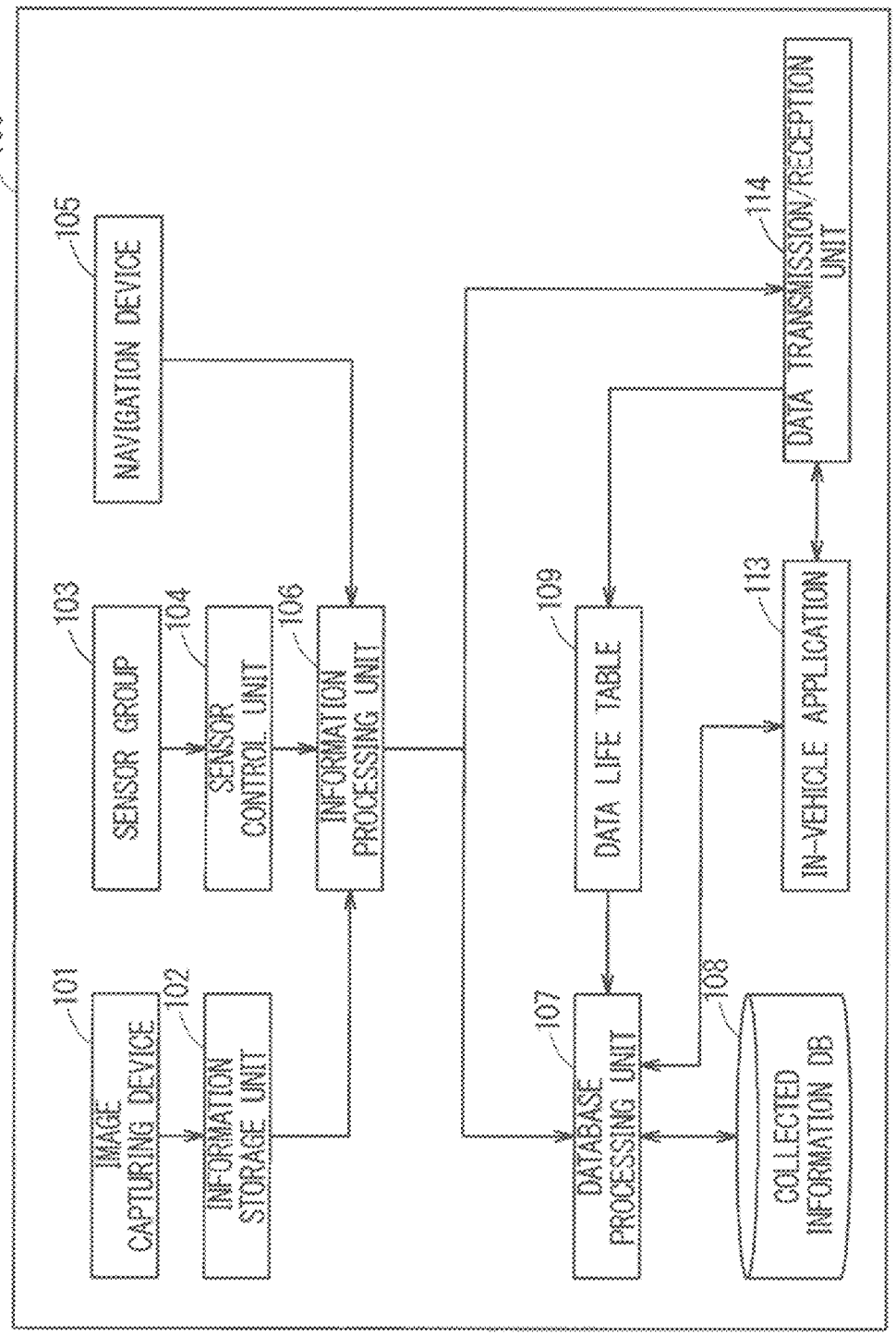
FIG. 20 A block diagram illustrating a configuration of an information collection device according to Embodiment 5.
Figure 21:
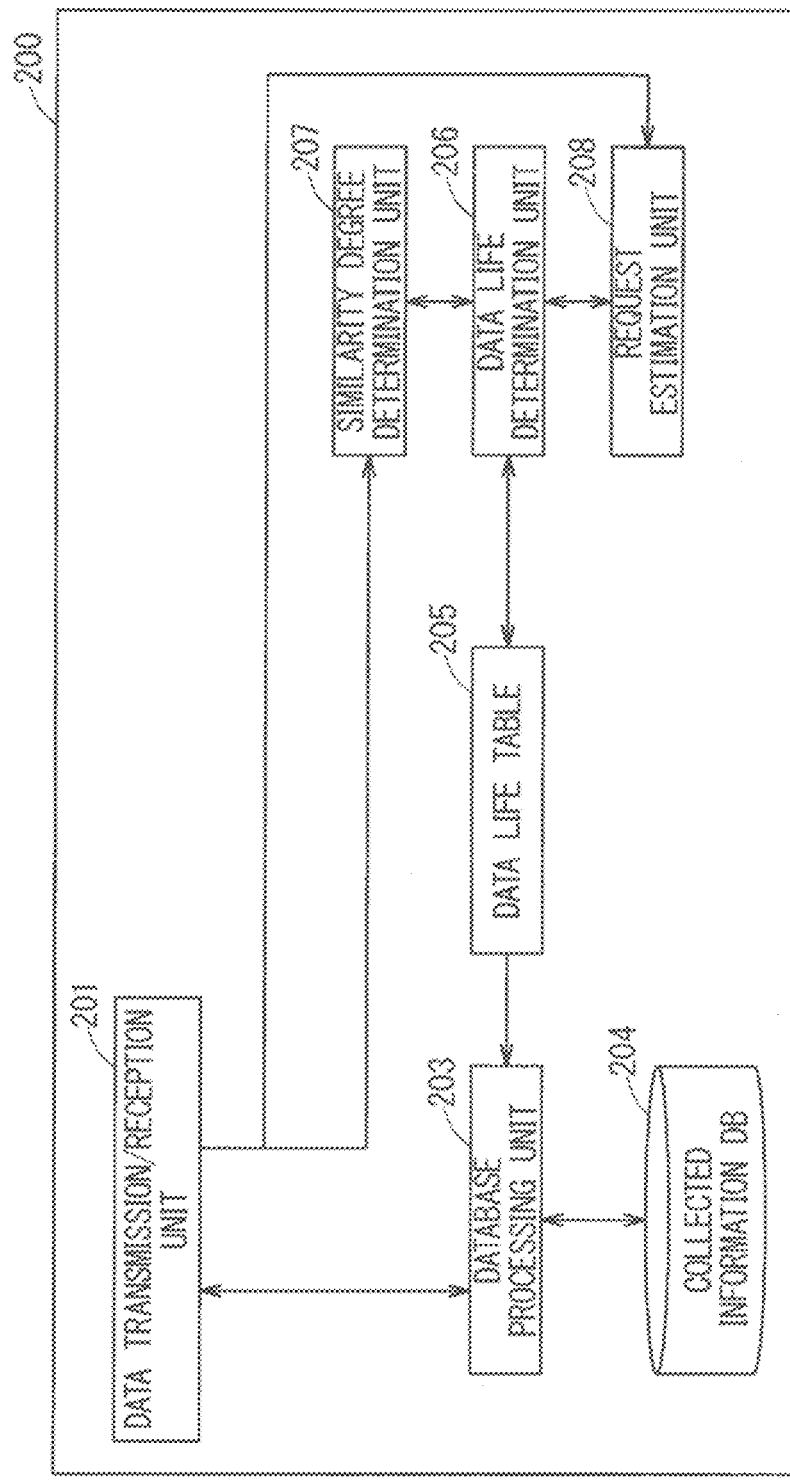
FIG. 21 A block diagram illustrating a configuration of an information providing server according to Embodiment 5.

FIG. 20 is a block diagram illustrating a configuration of an information collection device according to Embodiment 5 of the present invention, and FIG. 21 is a block diagram illustrating a configuration of an information providing server 200 according to Embodiment 5 of the present invention. Embodiment 5 has a configuration in which management of the saved-data and saving of a portion of the saved-data are moved from the information collection devices of Embodiments 1, 2, and 3 (FIGS. 1, 12, 14) used in the configuration of Embodiment 4 (FIG. 15) to the information providing server 200. Hereinafter, of the components according to Embodiment 5, the same or similar reference numerals are given to the same or similar components as those described above, and different components will be mainly described.

<Information Collection Device of Vehicle>

The information collection device of the vehicle 100 illustrated in FIG. 20 collects saved-data for at least one of the in-vehicle application 113 of the subject vehicle, the in-vehicle application 113 of the other vehicle, and the information providing application 304 of the information user terminal 300.

The database processing unit 107 stores the acquired-data from the information processing unit 106 in the collected information DB 108, and the data transmission/reception unit 114 transmits the saved-data to the information providing server 200. The in-vehicle application 113 uses the saved-data stored in the collected information DB 108 of the subject vehicle. The in-vehicle application 113 uses the saved-data of the other vehicle received by the data transmission/reception unit 114, and stores the saved-data in the collected information DB 108 as necessary. Of the information on the storage time limit (life) that the data transmission/reception unit 114 received from the information providing server 200, the data life table 109 duplicates and stores life information about the saved-data of the other vehicle stored in the collection information DB 108 of the subject vehicle.

<Information Providing Server>

The information providing server 200 in FIG. 21 centralizedly manages saved-data collected by a plurality of the vehicles 100. The information providing server 200 also provides saved-data in response to a request from the vehicle 100 and the information user terminal 300.

The data transmission/reception unit 201 receives the saved-data collected by the vehicle 100, transmits the saved-data to the vehicle 100, requests for the saved-data from the information user terminal 300, and transmits the saved-data to the information user terminal 300. Hereinafter, the data transmission/reception unit 201 receives the saved-data collected by the vehicle 100 as server reception data.

The database processing unit 203 stores the server reception data received by the data transmission/reception unit 201 in the collected information DB 204 as a server saved-data, and reads the server saved-data from the collected information DB 204 depending on a request for the server saved-data received by the data transmission/reception unit 201. Further, the database processing unit 203 refers to the data life table 205 and manages the server saved-data in the collected information DB 204.

The data life table 205 stores a storage time limit of server saved-data. The similarity degree determination unit 207 calculates the degree of similarity between the server reception data received by the data transmission/reception unit 201 and the server saved-data stored in the collected information DB 204. Then, the similarity degree determination unit 207 outputs, to the data life determination unit 206, a link in which the server reception data is associated with the server saved-data whose degree of similarity is equal to or higher than a threshold and is highest.

When the server saved-data is read and used by the in-vehicle application 113 and the information providing application 304, the request estimation unit 208 generates a link that associates the server saved-data and estimates a future request for the server saved-data. It is assumed that the in-vehicle application 113 and the information providing application 304 have also transmitted their own attributes upon the data request.

In the data life determination unit 206, based on the generation result in the similarity degree determination unit 207 and the estimation result in the request estimation unit 208, the storage time limits of the server saved-data in the collected information DB 204 are determined on a link-by-link basis.

The storage time limit determined in the data life determination unit 206 is stored in the data life table 205 or used by the database processing unit 203. When the capacity of the storage area of the collected information DB 204 is tight, the information providing server 200 may acquire the available capacity of the collected information DB 108 of the vehicle 100 with which communication is established, and transfer the server saved-data or the like, or may copy the server saved-data within a range not exceeding the available capacity.

Summary of Embodiment 5

According to the above configuration, the collected information DB 108 described in Embodiments 1, 2, 3, and 4 includes the collected information DB 108 being a first database provided in the vehicle 100 in FIG. 20 and the collected information DB 204 being a second database provided outside the vehicle 100 in FIG. 21. According to such a configuration, the capacity of the storage area of the collected information DB 108 of the vehicle 100 can be reduced. In addition, the same or extremely similar saved-data need not be redundantly saved in a plurality of vehicles 100, so that efficient data management is ensured. Further, the server 100 can back up the saved-data in the vehicle 100, the secure data management can be performed.

<Modification>

The information collection device described above is also applicable to an information collection system constructed as a system by appropriately combining vehicle devices such as Portable Navigation Devices (PND) and navigation devices, communication terminals including mobile terminals such as mobile phones, smartphones and tablets, a function of an application installed in at least one of vehicle devices and communication terminals, and a server. In this case, each function or each component of the information collection device described above may be distributed and arranged in each device that constructs the system, or may be integrated in any device.

It should be noted that Embodiments and Modification of the present invention can be arbitrarily combined and can be appropriately modified or omitted without departing from the scope of the invention.

While the invention has been described in detail, the forgoing description is in all aspects illustrative and not restrictive. It is understood that numerous other modifications and variations can be devised without departing from the scope of the invention.

EXPLANATION OF REFERENCE SIGNS 11a saved-data, 11b acquired-data, 12 link, 100 vehicle, 106 information processing unit, 107 database processing unit, 108, 204 collected information DB, 109 data life table, 110 data life determination unit 111 similarity degree determination unit, 112 request estimation unit, 113 in-vehicle application, 114 data transmission/reception unit, 202, 304 information providing application.

The invention claimed is:

1. An information collection device comprising:
   acquisition circuitry configured to acquire data including an image of at least one of inside and outside of a vehicle as acquired-data;
   similarity degree determination circuitry configured to
      obtain a degree of similarity between the acquired-data and the saved-data based on characteristics of the acquired-data and characteristics of the saved-data, the saved-data being the acquired-data stored in a database and
      generate a link that associates the acquired-data and the saved-data based on the degree of similarity;
   request estimation circuitry configured to generate a link that associates the saved-data when the saved-data is read, and estimate a future request for the saved-data;
   time limit determination circuitry configured to determine a storage time limit of the saved-data in the database on a link-by link basis based on a generation result in the similarity degree determination circuitry and an estimation result in the request estimation circuitry; and
   database processing circuitry configured to manage the saved-data in the database based on the storage time limit determined by the time limit determination circuitry.

2. The information collection device according to claim 1, wherein
   the data further includes sensor information collected by a sensor of the vehicle and navigation information collected by a navigation device of the vehicle.

3. The information collection device according to claim 1, further comprising:
   a time limit table configured to store the storage time limit determined in the time limit determination circuitry on a link-by-link basis, wherein
   the database processing circuitry is configured to reduce or delete the saved-data in the database based on the storage time limit stored in the time limit table.

4. The information collection device according to claim 1, wherein
   the request estimation circuitry is configured to estimate the request based on an attribute of an application that uses the saved-data in the vehicle.

5. The information collection device according to claim 1, further comprising
   communication circuitry configured to communicate at least one of the acquired-data and the saved-data with the outside of the vehicle.

6. The information collection device according to claim 1, wherein
   the request estimation circuitry is configured to estimate the request based on an attribute of an application that uses the saved-data outside the vehicle.

7. The information collection device according to claim 1, wherein
   the database includes a first database provided in the vehicle and a second database provided outside the vehicle.

* * * * *